Figure 1:
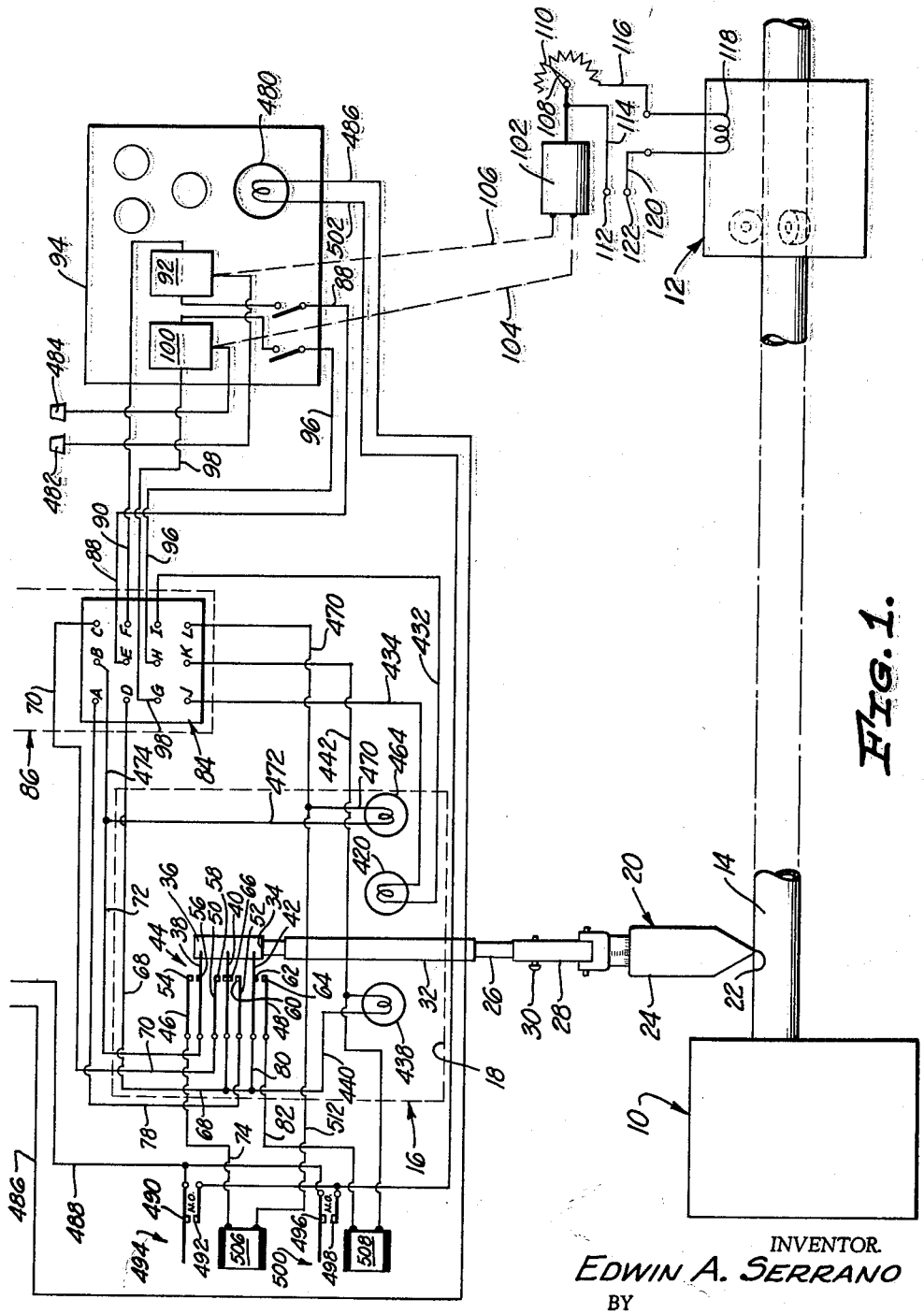

INVENTOR.
EDWIN A. SERRANO
BY
EDWARD D. O'BRIAN
ATTORNEY

United States Patent Office 3,184,788
Patented May 25, 1965

3,184,788
EXTRUSION CONTROL SYSTEM
Edwin A. Serrano, 1633 W. Cubbon St., Santa Ana, Calif.
Filed Feb. 5, 1963, Ser. No. 256,460
7 Claims. (Cl. 18—2)

Broadly this invention relates to an extrusion control system. More specifically the invention is concerned with an electrical control system for automatically adjusting a puller motor associated with an extrusion process to maintain the dimensional size of the article extruded by the process to within close tolerance of a desired size.

One of the major problems encountered in conjunction with high volume extrusion processes, especially in the plastics art, is the problem of maintaining the dimensions of the articles formed by the process without the necessity of sacrificing production volume or the quality of the extruded article. When continuous lengths of extruded plastic pipe, rods or beams are being formed it is the customary procedure to utilize an extrusion head through which fluid plastic is forced and a motor operated puller mechanism to apply a pulling force on the extruded article. This pulling force serves to extend the extrusion articles until they are chemically set to a required degree of rigidity and to increase the speed of the plastic material through the extrusion head. Due to the initial flow characteristics of the plastic material this pulling force frequently tends to overly stretch the articles or cause them to increase in diameter. When this occurs it is required that an operator adjust the speed of the pulling motor to permit the extruded article to assume its correct dimension. This type of control is objectionable because of the difficulty encountered by the operator to anticipate flow characteristics of the plastic material due to its rapid change from a fluid to a solid.

In consideration of the problems set forth above it is quite obvious to one skilled in the art that a system capable of automatically providing effective adjustment of the puller head, such as is provided by this invention, would constitute a major improvement in the art.

Accordingly, it is an object of the present invention to provide a control system having automatic operation which is capable of overcoming the disadvantages enumerated above.

Another object of the present invention is to provide a control system which responds to a particular characteristic of an extruded article to impose automatic control of the characteristic.

A further object of this invention is the provision of a control system responsive to a dimension of an extruded article to effect automatic control of the dimension.

It is a more specific object of the present invention to provide an electrical system utilized in conjunction with an extrusion process comprising an extrusion head and a puller motor wherein the control system senses a dimension of an article being produced by the process to regulate the speed of the puller motor to control the dimension of the article to within desired limits.

It is still another object of this invention to provide a control system for regulating an extrusion process which is inexpensive of manufacture, dependable in operation, readily removed and installed in operating position and one capable of performing properly through long periods of operation.

Figure 2:
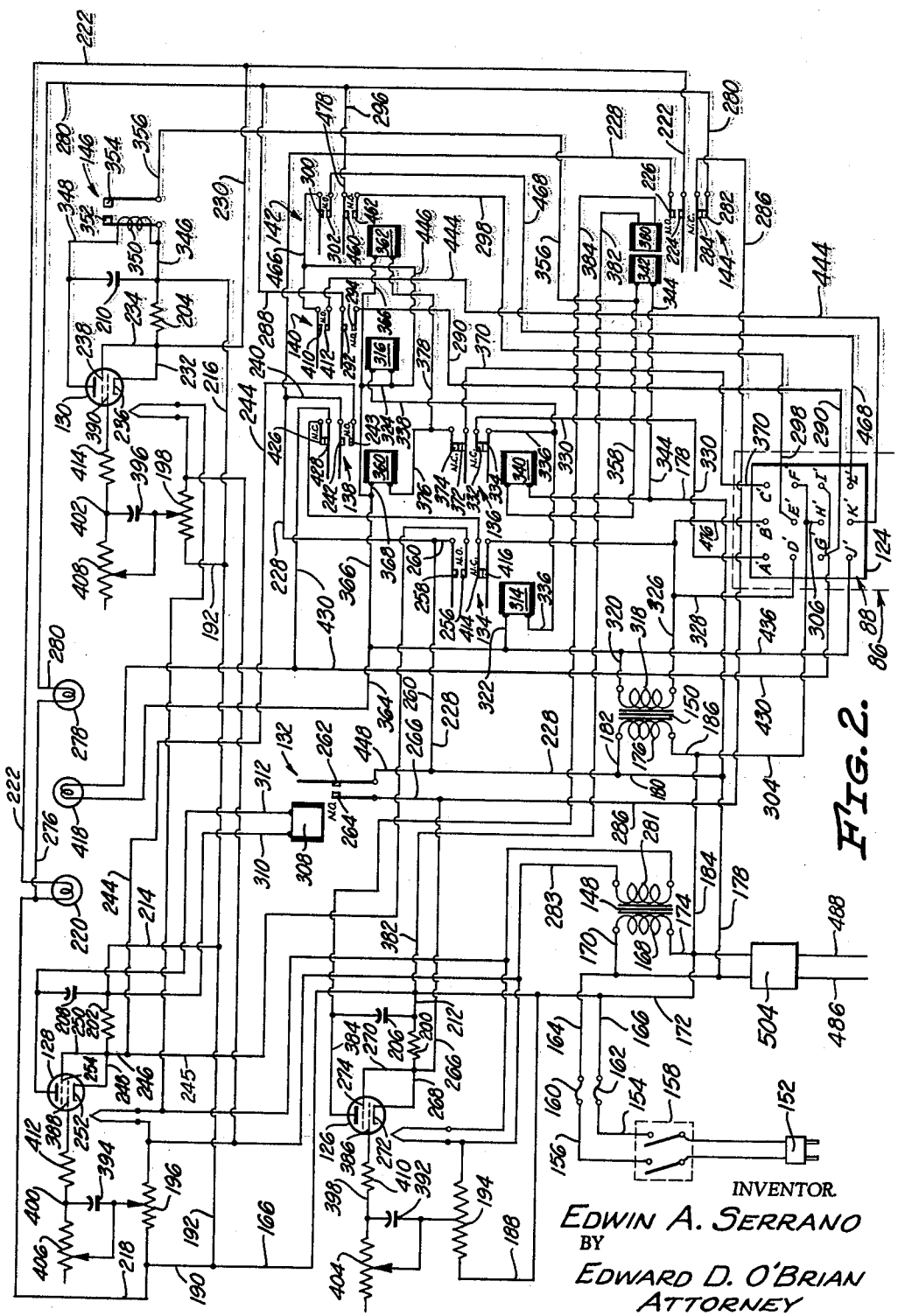

The manner in which the advantages of the present invention are more particularly realized and its further objects and features achieved will become more clearly apparent from the subsequent detailed description of the invention taken with reference to the accompanying drawings in which:

FIG. 1 is a schematic representation of a preferred form of the invention showing detector and motor control units associated with extrusion equipment; and FIG. 2 is a schematic representation of a control circuit utilized in conjunction with the arrangement in FIG. 1.

The accompanying drawing is primarily intended so as to illustrate a presently preferred means of constructing a control system falling within the scope of this disclosure. It is to be understood that those skilled in the art to which the invention pertains may effect alterations in the embodiment of the system disclosed by the use of routine and ordinary engineering skills without departure from the inventive concepts of the system. Also, further equivalent means can be employed in order to accomplish the operations and structural advantages of the invention.

As an aid toward understanding this invention it can be stated in essentially summary form that the preferred embodiment to be described involves a mechanically movable switch operating feeler that is biased to have one end in sliding contact with the outer wall of an extruded tube at a point along the length of the tube a short distance from where it emerges from an extrusion head. The feeler is arranged in a manner whereby an opposite end of the feeler will move a plurality of switching contacts in accordance with changes in the diameter of the extruded tube. These switching contacts are arranged to operate control circuits that regulate the speed of a puller motor arranged to apply a pulling force to the extruded tube proportional to the speed of the motor. Since the diameter of the extruded tube will decrease with increased motor speed and increase with decreased motor speed two control circuits are provided one for increasing and the other for decreasing motor speed. The switch contacts are arranged such that neither of these control circuits will be energized as long as the sensing end of the feeler remains within a certain range of movement represented by a range of tolerable variation in the diameter of the finished tubing. The switching contacts also control other circuits arranged to actuate an indicating system providing a visual representation of the functional state of the control system.

The invention can be more fully understood by referring to the accompanying drawings in which FIGS. 1 and 2 are schematic representations of the control circuit and its relationship to the conventional plastic extrusion head 10 and puller assembly 12 which are required to produce the extruded tubing 14 shown extending between the extrusion head 10 and the puller assembly 12. As may be seen in FIG. 1, the detector unit 16 having a suitable housing 18 is represented as being disposed adjacent the tubing 14 so that a feeler probe 20 is positioned with its sensing end opposite a point 22 of the tubing between the extrusion head 10 and the puller assembly 12.

The feeler probe 20 comprises a typical micrometer type lengthwise adjustable feeler head 24 which is adjustably supported on one end of a transmission rod 26 by means of a slide type tubular fitting 28 and its conventional set screw 30. This transmission rod extends in sliding disposition through a suitable sleeve guide 32 attached to the housing 18 so as to permit reciprocation of the rod with respect to the guide sleeve 32. The other end 34 of the rod which extends into the housing 18 is attached in fixed relation to a common switch support bar 36 which is in turn secured in a conventional manner to movable contact springs 38, 40 and 42 of a conventional multiple circuit leaf spring switch 44. This switch further includes outer leaf springs 46 and 48 and inner leaf springs 50 and 52. Single contacts 54, 56, 58, 60, 62 and 64 are provided on leaf springs 46, 38, 50, 52, 42 and 48, respectively. The movable leaf spring 40 is provided with a double contact 66 which is independently engageable with either of the contacts 58 or 60 depending upon which direction the probe 20 is deflected by changes in the diameter of tubing 14. The above contact spacing is such that an increase of .003 of an inch in the diameter of the tubing will deflect the probe upwardly as viewed in FIG. 1 a sufficient distance to close contacts 66 and 58 thereby energizing a circuit including the leads 68 and 70 connected to the leaf springs 40 and 50, respectively. Further increase in the diameter to .008 of an inch and in excess thereof will cause the contacts 56 and 54 to close to energize a circuit including the leads 72 and 74 respectively connected to the leaf springs 46 and 38. Similarly, reverse movement of the probe from its normal position causes contacts 66 and 60 to close and continued movement of the probe causes contacts 62 and 64 to close thereby energizing the circuits associated with leads 68, 78 and 82, 82 connected to lead springs 40, 52 and 42, 48, respectively.

The leads 68, 70, 72 and 78 are connected at their other ends to the plug terminals D, C, B and A of the male half 84 of a conventional Jones plug 86 which plugs cooperate with the plug receiving sockets D', C', B', and A', respectively, of the female half 88 of the Jones plug shown in FIG. 2. It is to be noted that the plug terminals E and F of the plug half 84 are connected by leads 88 and 90 to the terminals of a speed increasing solenoid operated switch 92 of a conventional speed control unit 94 used for controlling the pulling speed of the puller assembly 12. Similarly, terminals G and H are connected by leads 96 and 98 to a speed decreasing switch 100 of the speed control unit.

These speed control switches are connected in a conventional fashion to a reversible rheostat motor 102 as represented by the dashed lines 104 and 106. The motor 102 is utilized to drive a contact arm 108 in a speed increasing or decreasing direction along a resistance element 110 as commanded by the switches 92 and 100. Such movement of the contact arm regulates the magnitude of current flowing from the puller drive motor supply terminal 112 through lead 114, control arm 108, the adjusted length of the resistance 110, lead 116, the field winding 118 of the puller assembly drive motor and lead 120 to the other supply terminal 122.

The above described switching arrangement afforded by the switch 44 and the connections through the Jones plug 86 are utilized in conjunction with the control circuit shown in FIG. 2, which is connected through the female half 88 of the Jones plug to both the switch 44 and the speed control unit 94, to effect increases and decreases and decreases in the pulling speed of the puller assembly 12 to control the size or diameter of the tubing 14 within a tolerable range of diametral dimensions.

Basically the control circuit shown in FIG. 2 comprises three time delay circuits including the tetrodes 126, 128 and 130; a single switch relay 132, double switch relays 134, 136, 138, 140 and 142; a locking relay 144; thermal time delay switch 146; filament transformer 148; and a low voltage transformer 150.

Power is supplied to the control circuits through a plug 152 adapted to be connected to a conventional 117 volt power source. The power leads 154 and 156 connect to the plug 152 through an on-off switch 158 and protective fuses 160 and 162 to the power leads 164 and 166. Leads 164 and 166 are connected across the primary winding 168 of the filament transformer 148 by connecting leads 170 and 172, 174. The primary winding 176 of the low voltage transformer 150 is provided with power through leads 178, 180, 182 and leads 184 and 186.

The power lead 166 is further connected by leads 188, 190 and 192 to one side of variable input resistances 194, 196 and 198 of tetrodes 126, 128 and 130; and to the junctions of resistors 200, 202 and 204, and plate circuit capacitors 206, 208 and 210 of tetrodes 126, 128 and 130, respectively by the leads 212; 192, 214; and 192, 216.

Power lead 166 is also connected by the leads 190 and 218 to one side of the filament of the indicator lamp 220 whose other side is connected by the lead 222 to the contact 224 of the normally open contacts 224 and 226 of the locking relay 144. The other contact 226 is connected by the lead 228 and lead 180 to the other power lead 164. The lead 222 is further connected by a lead 230 and leads 232 and 234 to the cathode 236 and second grid 238 of the tetrode 130. The lead 228 is further connected by lead 240 to the normally open contact 242 of the relay 138 whose other normally open contact 243 is connected by the leads 244, 246, 248 and 250 to the cathode 252 and second grid 254 of the tetrode 128. The lead 244 is further connected by lead 245 to the normally open contact 256 of the relay 134 whose other normally open contact 258 is connected by the lead 260 to the normally open contact 262 of relay 132 whose other normally open contact 264 is connected by leads 266, 268 and 270 to the cathode 272 and second grid 274 of the tetrode 126.

Power lead 166 is further connected through the lead 218 by lead 276 to one side of the filament of an indicator lamp 278 the other side of which filament is connected by lead 280 to the normally closed contact 282 of the locking relay 144 whose other normally closed contact 284 is connected by the leads 286, 266 and 268 to the cathode 272 of the tetrode 126. Lead 280 also connects the power lead 166 to the terminal G' of the Jones plug half 124 by the leads 288 and 290 which are connected to the normally open contacts 292 and 294, respectively, of the relay 140. Similarly, lead 280 connects power lead 166 to the terminal E' of the Jones plug half 124 by lead 296 and 298 which, respectively, are connected to the normally open contacts 460 and 462 of the relay 142. The power lead 166 is also connected directly to the terminals F' and H' of the Jones plug half 124 by leads 304 and 306.

The solenoid coil 308 of the relay 132 is energized by the output of the tetrode 128 by means of the output leads 310 and 312. Energization of the solenoid coils 314 and 316 of the relays 134 and 140, respectively, is effected from the secondary winding 318 of the low voltage transformer 150 by means of the leads 320, 322 and 324 leading from one side of the transformer and from the other side of the transformer 150 through switch contacts 60 and 66 when they close as a result of a decrease in the diameter of the tubing 14 by means of lead 326 extending between the low voltage transformer 150 and the terminal B' of the Jones plug half 124, the lead 328 connecting lead 326 to the terminal D' of the Jones plug half 124, the lead 68 connected from terminal D of the Jones plug half 84 and contact 66 of switch 44, the lead 78 extending between the contact 60 and the Jones plug terminal A, the lead 330 extending between the Jones plug terminal A' through normally closed contacts 332 and 334 of relay 136, lead 336 extending to the other side of the solenoid winding 314 of relay 134, and the lead 338 extending to the other side of the solenoid winding 316 of the relay 140.

Solenoid winding 340 and the locking solenoid winding relay 342 of the relay 136 and the locking relay 144 are energized from the power lines 164 and 166 by the lead 178 extending to one side of the winding 340 and lead 344 extending from lead 178 to one side of the winding 342; and by the output of the tetrode 130 comprising the leads 346 and 348 which are connected to the heater element 350 of the thermal delay switch 146 and the contact 352 which in turn is connected upon closing of the switch 146 to the contact 354, lead 356 extending between contact 354 and the other side of the winding 342 and the lead 358 extending from the lead 356 and the other side of the winding 340 of the relay 136.

Solenoid windings 360 and 362 are energized from the low voltage transformer 150 through the lead 364 and branch leads 366 and 368 connecting to one side of windings 360 and 362, respectively; and upon the closing of contact 66 with respect to contact 58 through lead 70 extending from contact 58 to the Jones terminal C and lead 370 extending between the Jones plug terminal C' through the normally closed contacts 372 and 374 of relay 136 and the lead connecting to the other side of the winding 360 which is in turn connected through lead 378 to the other side of the winding 362.

The switching solenoid winding 380 of the locking relay 144 is energized by the output of the tetrode 126 through the leads 382 and 384.

The secondary winding 281 of the filament transformer 148 is connected in parallel to the filaments of the tubes 126, 128 and 130 in conventional fashion from the leads 283 and 285.

In the circuit shown in FIG. 2 each of the tetrodes, 126, 128, and 130 comprises a time delay circuit. These circuits serve the purpose along with the thermal delay switch 146 to provide periods of time delay during various stages of each speed correction cycle. The timer comprising tube 128 is of rather short duration to serve the purpose of permitting small enlargements and depresses such as would result from bubbles, for example, to pass the sensing probe 20 without commanding the control circuit to correct the pulling speed of the puller assembly 12. The delay period for the timer tube 126, as will be described, is for the purpose of permitting actuating current to flow to the switches 92 and 100 during a stage of the correction cycle. This period is of rather short duration. The delay time of the timer tube 130 is of rather long duration and serves the purpose of permitting the extruder 10 and puller 12 assemblies to effect proper corrections to the size of the tubing 14 in the presence of the slow response of the flow of the material forming the tubing 14 and to permit the tubing to be moved from the extruder past the detecting point 22. In each of these circuits the cathodes 272, 252, and 236 set up an electron flow to the grids 386, 388 and 390 upon the closing of the on-off switch 158. The resultant current flow charges the capacitors 392, 394 and 396 so that the points 398, 400 and 402 between the adjustable resistors 404, 406 and 408 and the current limiting resistors 410, 412 and 414 are negatively charged. Accordingly, when the normally open contacts of relay 138, for example, are closed by the energization of the winding 360 of the relay 138 current is conducted to the tetrodes but no current flow is present in the plate circuits of these tubes because the grids 386, 388 and 390 are held at cutoff by the negative bias imposed on the capacitors 392, 394 and 396 across the plate circuits. This negative bias is eventually dissipated by leakage through the resistors 404, 406 and 408 as determined by the time constant for the adjusted value of the resistors 404, 406 and 408 and the capacitance of the associated capacitors 392, 394 and 396. After this negative bias has fallen to a sufficiently low level the grids 386, 388 and 390 are no longer at a cutoff potential and the tetrodes 126, 128 and 130 become conductive thereby effecting a current flow in the plate circuits whereby for example, current is conducted through the leads 310 and 312 of the tetrode 128 to energize the relay 132 so that contacts 262 and 264 are closed. In these timing circuits the capacitors 206, 208 and 210 are placed in circuit across the outputs of the tetrodes 126, 128 and 130, respectively, to eliminate chattering of the contacts of the locking relay 144 and the relay 132 operated by the outputs of tubes 126 and 128 and to avoid similar contact chatter in the thermal delay switch 146 operated by the output of tube 130.

Having described the general circuit of the control system shown in FIGS. 1 and 2 the remaining details of the circuit included therein will be described in conjunction with the operation of the system. As previously stated this control system has two modes of operation. In one mode the circuits of FIGS. 1 and 2 effect a decrease in the pulling speed of the puller assembly 12 to cause the more slowly pulled tubing 14 to increase in diameter. In the other mode of operation the pulling speed of the puller assembly is increased to similarly effect a decrease in diameter of the tubing 14. In the embodiment of the control system described the contacts 58 and 60 are separately engaged by the contact 66 upon a change of .003 inch in the diameter of the tubing from a desired size and the pairs of contacts 54, 56 and 62, 64 are closed when the diameter of the tubing changes ±.008 inch.

When the diameter of the tubing 14 decreases by an amount equal to or greater than .003 inch, movement of the feeler probe 20 will cause closing of the contacts 66 and 60 of the switch 44. This will result in the potential of lead 326 connected to the secondary winding of the transformer 150 being applied to one side of the relay windings 314 and 316 of the relays 134 and 140 through leads 328, 68, 78, 330, 336 and 338. The other sides of these windings are connected to the other side of the secondary winding 318 by leads 320, 322 and 324. This will result in the closing of the normally open contacts 258, 256 of relay 134 and the contact pairs 292, 294 and 410, 412 of relay 140; and the opening of the normally closed contacts 414 and 416 of relay 134.

The opening of contacts 414 and 416 opens the circuit of the green lamps 418 and 420 which serve to provide a visual indication that the control system is not effecting correction to the puller assembly because the diameter of the tubing 14 is within ±.003 inch of its desired diameter. These green lamps are connected across the winding 318 of transformer 150 by leads 422, normally closed contacts 414 and 416 of relay 134, lead 424, normally closed contacts 426 and 428 of relay 138, lead 430 which connects to one side of the filament of the lamp 418 and lead 430 which connects through the Jones plug terminals I' and I and lead 432 connected to one side of the filament of lamp 420. The other sides of these lamp filaments are connected by leads 434, Jones plug terminals J and J', lead 436 and lead 364 to the other side of winding 318. Accordingly, when relays 134 and 138 are unenergized these lamps are lighted but when either of these relays are energized the lamp circuit is opened.

Similarly, the closing of contacts 410 and 412 of relay 140 energizes the white lamp 438 through closing of the circuit comprising lead 440 extending between lead 68 and one side of the lamp filament and lead 442 extending from the lamp filament through Jones plug terminals K and K', lead 444, contacts 410 and 412 of relay 140 and lead 446 connecting to lead 324. The purpose of the lamp 438 is to indicate that correction should be made by the control circuit.

Closure of the contacts 256 and 258 of the relay 134 provides power from lead 260 which is connected to lead 228 and leads 245 and 246 to the cathode 252 of the timer comprising tube 128. After the above described time delay period, the plate circuit of the tube 128 becomes conductive which effects energization of the winding 308 of the relay 132 through leads 310 and 312. This causes the normally open contacts 262 and 264 to close which in turn causes the timer comprising tube 126 to be energized through leads 448 and 266. At the same time current is conducted through lead 286, connected to lead 266, through the normally closed contacts 282 and 284 of the locking relay 144, lead 280, lead 288, closed contacts 292, 294 of relay 140, lead 290, Jones plug terminals G' and G and lead 98 to the solenoid winding of switch 100. As previously described the other side of the winding of switch 100 is connected by lead 96, through the Jones plug terminals H' and H, and leads 304 and 184 to the power line 166. By virtue of this latter connection the switch 100 is energized and the rheostat motor 102 is operated to decrease current flow through the field winding 118 of the drive motor of the puller assembly 12 to thereby reduce the pulling speed to effect an increase in the diameter of the tubing 14. The switch 100 will remain energized for the duration of the time delay of the timer comprising tube 126.

Visual indication of the operation of switch 100 is effected by the completion of the circuit energizing the red timing lamp 278 through lead 280. This lamp will remain lighted as long as switch 100 is energized.

Upon tube 126 becoming conductive, the plate circuit leads 382 and 384 will energize the switching winding 380 of the locking relay 144. This will result in the opening of contacts 282 and 284 thereby de-energizing the switch 100. At the same time, the timer comprising tube 130 will be started by the application of voltage to the cathode 236 through leads 232 and 230 and the now closed contacts 224 and 226 of the locking relay.

The adjustable resistance 408 of the timer tube 130 is set to effect a rather long time delay before firing of the tube to permit a sufficient length of the tubing 14 to be moved from the extrusion head 10 past the detecting point 22 and to allow for the delay in response resulting from the flow characteristics of the material forming the tubing. This will provide sufficient time so that the reduction in the speed of the puller will have its total effect on the diameter of the tubing.

When the tube 130 becomes conductive the plate circuit leads 348 and 346 energize the heating coil 350 of the thermal delay switch 146 whose contacts 352 and 354 close after sufficient heat is developed to distort a bimetallic element controlling the position of contact 352 in a conventional fashion. Upon the closing of switch 146, the output of timing tube 130 is applied through the lead 356 to the locking winding 342 of the locking relay 144. And, at the same time, the winding 340 of relay 136 is energized since it is in circuit with the winding 342. Accordingly the contacts 332 and 334 open thereby breaking the energizing circuit, through lead 336, to de-energize the windings of relays 134 and 140. This results in the turning off of the entire control circuit even if the correction applied to the puller assembly is not enough to break connection between contacts 66 and 60 of switch 44.

After the entire control circuit has been turned off the thermal delay switch contacts will open after a brief cooling period thereby restoring the circuit of the winding 340 of relay 136 and the locking winding 342 of the locking relay 144 to its open circuit condition. This will restore the control circuit to its un-energized starting condition. If at this time contacts 66 and 60 remain closed, indicating more correction is required the above described cycle will be repeated and will be repeated as many times as necessary to increase the diameter of the tubing 14 to within .003 inch of its desired diameter.

The operation of the control circuit insofar as the function of timer tubes 126, 128 and 130, locking relay 144 and relay 136 is the same when the diameter of the tubing 14 increases to .003 inch or more over the desired diameter. The basic differences are that the timer tube 128 is started through the relay 138 and control of switch 92 is effected through the relay 142.

When the contacts 66 and 58 of the switch 44 are closed by such increase in the diameter of tubing 14, the potential of contact 66 is applied to the windings 360 and 362 of the relays 138 and 140 through lead 70, Jones plug terminals C and C', lead 370, normally closed contacts 372 and 374 of relay 136, lead 376 and lead 378. Upon energization of these windings 360 and 362, normally closed contacts 426 and 428 of relay 138 will open and the normally open contacts 242 and 243 of relay 138 and contacts 300, 302 and 460, 462.

The opening of contacts 426 and 428 of relay 138 causes the green lamps 418 and 420 to be turned off by disrupting the supply circuit lead 430 energizing these lamps.

The red lamp 464 which provides visual indication that the diameter of tubing 14 is enlarged by an amount greater than .003 inch is energized upon the closing of contacts 300 and 302 of the relay 142. This is effected by breaking the energizing circuit of this lamp which comprises leads 320, 324, 446 and 466, contacts 300 and 302, lead 468, Jones plug terminals L' and L, lead 470, the filament of lamp 464, leads 472 and 474, Jones plug terminals B and B'; and leads 476 and 326.

In this mode of operation of the control circuit, the cathode 252 of the timer tube 128 is energized by the closure of contacts 242 and 243 of the relay 138 and the circuit comprising leads 228, 240, 244, 246 and 248.

After timer tube 128 has been thus turned on the operation of the circuit is the same until timer tube 126 is energized upon the closing of contacts 262 and 264 of relay 132. When this occurs the control switch 92 becomes energized through leads 286, contacts 282 and 284 of the locking relay 144, leads 280 and 478, contacts 460 and 462 of relay 142, lead 298, Jones plug terminals E' and E, lead 88, the winding of switch 92, lead 90, Jones plug terminals F and F', and leads 306 and 304.

At the same time tube 126 is energized and switch 92 is closed the timing lamp 278 will be energized by the connection comprising lead 280 to the filament of lamp 278. This, as in the previously described mode of operation, provides visual indication that a correction of speed of the puller assembly 12 is being made.

When timing tube 126 fires after its delay period has elapsed the switching winding 380 of the locking relay 144 is energized in the same manner as in the previous mode of operation. Upon closing of the contacts 224 and 226 of this relay the cathode 236 of timer tube 130 becomes energized. After the delay period of tube 130 the thermal delay switch 146 is energized and upon closing of this switch the locking winding 342 of the locking relay 144 and the winding 340 of relay 136 are energized. The results of energizing these relays is the same except that the energization of relays 138 and 142 is disrupted by the opening of switching contacts 372 and 374 of relay 136.

As in the previously described mode of operation this cycle is repeated until the diameter of the tubing has been sufficiently reduced to open contacts 66 and 58 of the probe actuated switch 44.

In each of the modes of operation described the indicator lamp 220 is lighted upon the energization of the switching winding 380 of the locking relay 144 through lead 222 which is connected through the closed contacts 224 and 226 to the power lead 164 by means of leads 228, 180, and 178. This lamp provides visual indication that a correction has been made.

In addition to the previously described indicator lamps 220, 278, 418, 438, 420 and 464, an indicator lamp 480 is provided to indicate when the diameter of the tubing 14 is exceeding .008 inch, either as an increase or decrease in diameter. The purpose of this indication is to appraise the operator that the condition causing the increase or decrease of diameter is not being corrected rapidly enough by the control system. In such a case, the operator will speed up the correction by manually operating the switches 100 or 92 by means of conventional switch operating buttons 482 and 484 until sufficient correction has been effected so that any further changes in the diameter of the tubing can be taken care of by the control system. This usually occurs at the start of operation of the extruder 10 or when a different material is used to make the tubing. Once such manual adjustment is made the control system is capable of taking care of any further changes of the diameter of the tubing.

Such indication is provided by lamp 480 whose filament is connected directly to power line 164 by lead 486 and to power line 166 by lead 488 which is connected through contacts 490 and 492 of relay 494 or contacts 496 and 498 of a relay 500 and lead 502. In order to make this indicator salient a conventional flasher unit 504 is interposed in the leads 486 and 488. The relays 494 and 500 are actuated by means comprising the windings 506 and 508, respectively. The winding 506 is energized by lead 74, winding 506, lead 512 and lead 470 one side of the secondary winding 318 of transformer 150; and leads 72 and 474 to the other side of winding 318. The winding 508 is similarly energized through leads 80 and 82 to one side of winding 318 of transformer 150 and lead 82, winding 508 and lead 520 and 442 to the other side of winding 318. By virtue of this arrangement whenever the probe moves sufficiently upward as viewed in FIG. 1 contacts 54 and 56 will close or when the probe moves sufficiently downward contacts 62 and 64 will close to energize the lamp 480.

From the foregoing it is apparent that the present invention provides an automatically operated control system which is responsive to a dimension of a continuously extruded article to maintain the dimension within an extremely close tolerance range. The use of this control system enables extrusion processes to be conducted at extremely high speeds with such speeds being limited only by the flow and setting characteristic of the material used in the process. Another important contribution to the art afforded by this control system is the elimination of waste sections of extruded articles which heretofore were simply cut out from the length of the extruded article.

It will be realized by those skilled in the art to which the invention pertains that by ordinary skills a variety of differently appearing control systems may be designed and constructed utilizing the features of the invention as embodied in the above described example of the control system of this invention. Accordingly, since the circuits and structures of this invention are susceptible to such modification the invention is to be considered as being limited only by the appended claims.

I claim:
1. A control system which comprises:
    an extrusion head for forming a continuous article;
    pulling means for applying a continuous pulling force on said article in a direction away from said extrusion head whereby the magnitude of said force is proportioned to and determines a dimension of said article;
    adjustable means for regulating the magnitude of said force;
    sensing means responsive to said dimension of said article to effect an electric signal when said dimension deviates from a specified range of magnitudes;
    control circuit means responsive to said signal in circuit connection between said sensing means and said adjustable means responsive to said signal to provide an output to adjust said adjustable means, said control circuit means comprising a first time delay means actuated in response to said signal and a second time delay means actuated by the output of said first time delay means, said output of said first time delay means being connected to means to adjust said adjustable means so that no adjustment is made during said first time delay to permit short time deviations to pass without adjustment, and wherein the output of said second time delay means is operable to disconnect the output of said first time delay means from said means to adjust said adjustable means so that said adjustment of said adjustable means is made during the entire second time delay period.
2. A control system as defined in claim 1 wherein:
    said control circuit further includes a third time delay means actuated by said output of said second time delay means, and wherein the output of said third time delay means is operable to disable said first and second time delay means.
3. A control system as defined in claim 2 wherein:
    said sensing means is responsive to an increase in said dimension to effect a first signal and responsive to a decrease in said dimension to develop a second signal;
    means responsive to said first signal to actuate said first timing means; and
    means responsive to said second signal to actuate said first timing means.
4. A control system as defined in claim 3 wherein:
    said first, second and third time delay means each comprise a tetrode.
5. A control system which comprises:
    an extrusion head for extruding an article of continuous length;
    puller drive means for applying a pulling force on said article in a direction away from said extrusion head to control the dimensions of said article in accordance to the speed of said drive means;
    adjustable means for changing the speed of said drive means;
    sensing means responsive to changes in said dimension to effect a first signal upon an increase in said dimensions and a second signal upon a decrease in said dimensions; and
    control circuit means comprising a first switch responsive to said first signal to actuate a first time delay circuit having an output after a first time delay period, said first time delay circuit being connected to prevent change in the speed of said drive means during said first time delay period to permit short changes in said dimension to pass without changing the speed of said drive means, a second switch responsive to said second signal to actuate said first time delay circuit; the output of said first time delay circuit being connected to actuate a second time delay circuit having an output after a second time delay period and to actuate means for adjusting said adjustable means, the output of said second time delay means being connected to disable said means to adjust said adjustable means so that said adjustable means is adjusted during said entire second time delay period.
6. A control system as defined in claim 5 wherein:
    said control circuit further comprises a third time delay circuit having an output after a third time delay period, said third time delay circuit being actuated by the output of said second time delay circuit, said third time delay circuit being connected to prevent adjustment of said adjustable means during the third time delay period, and wherein the output of said third time delay circuit is effective to de-energize said first and second time delay circuits.
7. A control circuit as defined in claim 6 wherein:
    said first, second and third time delay circuits each comprise a tetrode.

References Cited by the Examiner
UNITED STATES PATENTS

| 1,867,225 | 7/32 | Le Van et al. | 219—108 |
| 2,369,858 | 2/45 | Ryan | 18—13 |
| 2,372,162 | 3/45 | Ryan | 18—13 |
| 2,393,015 | 1/46 | Bendz. | |
| 2,627,087 | 2/53 | Hendry. | |
| 3,015,129 | 1/62 | Hays et al. | 18—21 X |

WILLIAM J. STEPHENSON, *Primary Examiner.*
MICHAEL V. BRINDISI, *Examiner.*